(12) United States Patent
Yaegel

(10) Patent No.: US 8,776,844 B1
(45) Date of Patent: Jul. 15, 2014

(54) FLOW DIVERTER

(76) Inventor: Carl F. Yaegel, Decatur, IL (US)

(*) Notice: Subject to any disclaimer, the term of this patent is extended or adjusted under 35 U.S.C. 154(b) by 812 days.

(21) Appl. No.: 12/931,556

(22) Filed: Feb. 3, 2011

(51) Int. Cl.
B65G 69/04 (2006.01)

(52) U.S. Cl.
CPC .................................. B65G 69/0441 (2013.01)
USPC ............ 141/301; 141/205; 239/684; 239/687

(58) Field of Classification Search
CPC .... B65G 11/12; B65G 11/123; B65G 11/126; B65G 47/19; B65G 69/04; B65G 69/0441; B65G 69/0458
USPC ......... 141/192, 198, 255, 263, 264, 286, 331, 141/332; 239/666, 687, 697; 414/287
See application file for complete search history.

(56) References Cited

U.S. PATENT DOCUMENTS

| | | | | |
|---|---|---|---|---|
| 1,534,023 A * | 4/1925 | Betton | .............................. | 193/14 |
| 2,515,725 A | 7/1950 | McLemore | ........................ | 47/58 |
| 2,858,050 A * | 10/1958 | Barnard | .......................... | 222/88 |
| 3,175,668 A * | 3/1965 | Stoltzfus | ............................. | 193/3 |
| 3,177,908 A * | 4/1965 | Kaufman | ...................... | 141/321 |
| 3,248,117 A * | 4/1966 | Donelson, Jr. | ................ | 239/684 |
| 3,258,142 A | 6/1966 | Girardi | ........................ | 214/83.1 |
| 3,734,215 A * | 5/1973 | Smith | .............................. | 177/59 |
| 4,040,529 A * | 8/1977 | Wurdeman et al. | ........... | 414/301 |
| 4,264,213 A | 4/1981 | Dillman | ............................ | 366/9 |
| 4,307,987 A * | 12/1981 | Legille et al. | ................. | 414/205 |
| 4,316,681 A * | 2/1982 | Sida | ............................... | 406/162 |
| 4,419,036 A * | 12/1983 | Beckenbach et al. | .......... | 414/160 |
| 4,572,782 A * | 2/1986 | Smith et al. | .................... | 209/236 |
| 4,697,686 A * | 10/1987 | West | ............................... | 193/23 |
| 5,020,701 A * | 6/1991 | Donelson | ...................... | 222/494 |
| 5,316,429 A | 5/1994 | Connelly et al. | ................ | 44/298 |
| 5,687,780 A * | 11/1997 | Minami | ......................... | 141/286 |
| 5,755,837 A * | 5/1998 | Beierle et al. | ...................... | 48/76 |
| 6,234,317 B1 * | 5/2001 | Sommer | .......................... | 209/3 |
| 6,591,972 B1 * | 7/2003 | Forrest | .......................... | 198/532 |
| 6,763,925 B2 * | 7/2004 | Woods | .......................... | 198/311 |
| 7,404,376 B2 * | 7/2008 | Hernandez | ................. | 119/57.91 |
| 7,717,063 B2 * | 5/2010 | Chang et al. | ............... | 119/57.91 |
| 7,931,432 B2 * | 4/2011 | Hershberger | ................. | 414/301 |
| 2003/0121760 A1* | 7/2003 | Forrest | .......................... | 198/523 |
| 2006/0180232 A1* | 8/2006 | Glewwe et al. | ..................... | 141/2 |
| 2007/0297880 A1* | 12/2007 | Pinon et al. | ................... | 414/301 |

* cited by examiner

Primary Examiner — Timothy L Maust
Assistant Examiner — Robert Bell, III
(74) Attorney, Agent, or Firm — Philip L. Bateman

(57) ABSTRACT

An apparatus diverts the flow of bulk solids into a bin from a discharge of a bulk solids conveyor. The apparatus contains a fitting that attaches to the discharge, a frame with a vertical conduit, at least two baffles that pivot on rotating shafts and are capable of variable positioning between a substantially vertical position that opens the vertical conduit of the frame and a substantially horizontal position that substantially closes the vertical conduit of the frame, and a drive motor to rotate the baffles.

7 Claims, 4 Drawing Sheets

FIG. 3
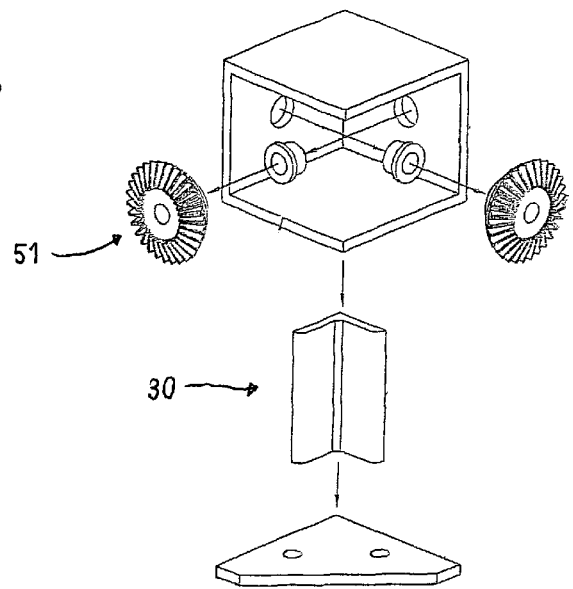
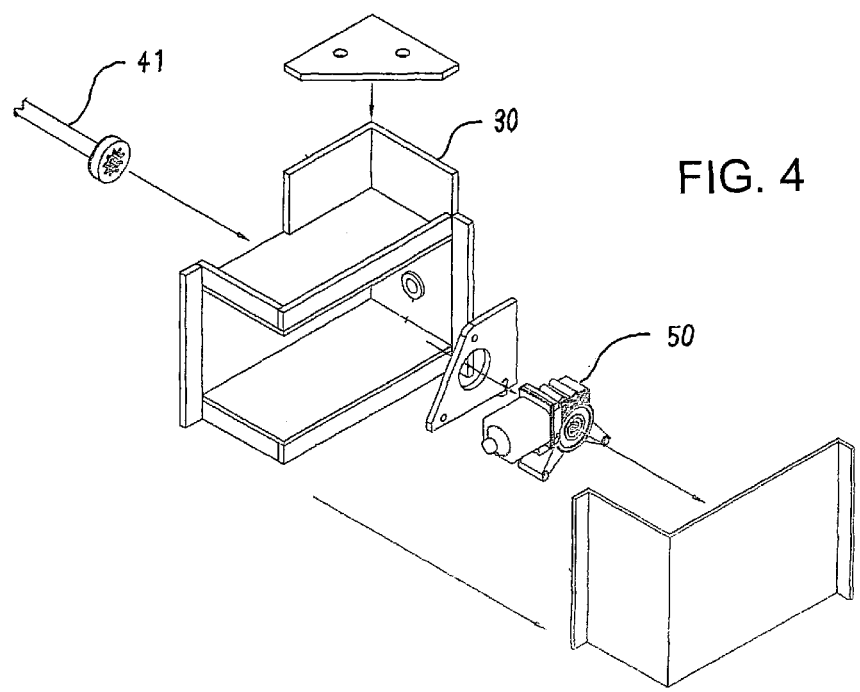
FIG. 4

FLOW DIVERTER

FIELD OF THE INVENTION

This invention relates to the handling of bulk solids. More particularly, this invention relates to an apparatus for diverting the flow of bulk solids.

BACKGROUND OF THE INVENTION

Bulk solids, also known as bulk granular materials, are commodities that have relatively small particle sizes and are typically transported unpackaged in large quantities by ship, rail, or truck. Examples of bulk solids are grains, products from grains, and chemicals.

Bulk solids are handled (moved from container to container) using a variety of conveying equipment. Commonly used conveying equipment include conveyor belts, screw conveyors (also known as augers), drag flight conveyors, and pneumatic systems. Bulk solids are often loaded into bins by moving them to a central point above the bin and discharging them to pour down by gravity into the bin. The term "bin" is used herein to refer to containers of any type for bulk solids, whether resting on the ground or part of ships, rail cars, or trucks, and includes tanks, silos, hoppers, etc.

When bulk solids are poured onto a horizontal surface, a conical pile is formed. The internal angle between the surface of the pile and the horizontal surface is known as the angle of repose and is a function of the density, shape, surface area, and coefficient of friction of the bulk solids. Many bulk solids have angles of repose in the range of 30 to 45 degrees.

When bulk solids are poured into a bin from the discharge of a conveyor that is positioned in a central overhead location, the pouring must stop when the top of the conical pile reaches the top of the bin. Due to the angle of repose, unfilled space remains in the bin around the top of the perimeter. This wasted space often represents five or more percent of the total volume of the bin. To reduce the volume of wasted space, workmen sometimes manually shovel the solids into the voids. However, this is a slow and labor intensive process.

Baffles are used in various types of equipment to provide mixing and dispersion of solids. Pieces of equipment with stationary baffles are disclosed in McLemore, U.S. Pat. No. 2,515,725, Jul. 18, 1950; Girardi, U.S. Pat. No. 3,258,142, Jun. 28, 1966; and Connelly et al., U.S. Pat. No. 5,316,429, May 31, 1994. Dillman, U.S. Pat. No. 4,264,213, Apr. 28, 1981, discloses an asphalt mixing apparatus with two separate, manually movable baffles in a chute that improve mixing. None of these pieces of equipment contains a flow diverter having multiple baffles that move in coordination.

Accordingly, there is a demand for an improved apparatus for diverting the flow of bulk solids into a bin from a central overhead discharge.

SUMMARY OF THE INVENTION

The general object of this invention is to provide an improved apparatus for diverting the flow of bulk solids into a bin from a central overhead discharge.

I have invented an apparatus for diverting the flow of bulk solids into a bin from a central overhead discharger. The apparatus comprises: (a) a fitting for removable attachment to a discharge of a bulk solids conveyor, the fitting having a vertical conduit; (b) a frame connected to the fitting, the frame having a vertical conduit communicating with the vertical conduit of the fitting, the frame also having a plurality of side walls, each with an opening; (c) a plurality of baffles that pivot on rotating shafts in the openings of the side walls of the frame, each baffle being capable of variable positioning between a first position that opens the vertical conduit of the frame to allow any bulk solids flowing into the diverter to flow out of the diverter without a change in direction and a second position that at least partially closes the vertical conduit of the frame to cause a portion of any bulk solids flowing into the diverter to be diverted outward; and (d) a drive motor to rotate the baffles.

The apparatus of this invention enables a bin to be substantially completely filled with bulk solids discharged from a central overhead conveyor.

BRIEF DESCRIPTION OF THE DRAWINGS

FIG. 3 is an upside down detailed exploded perspective view of a gear box assembly thereof.

FIG. 4 is a detailed exploded perspective view of a motor box assembly thereof.

DETAILED DESCRIPTION OF THE INVENTION

Figure 1:
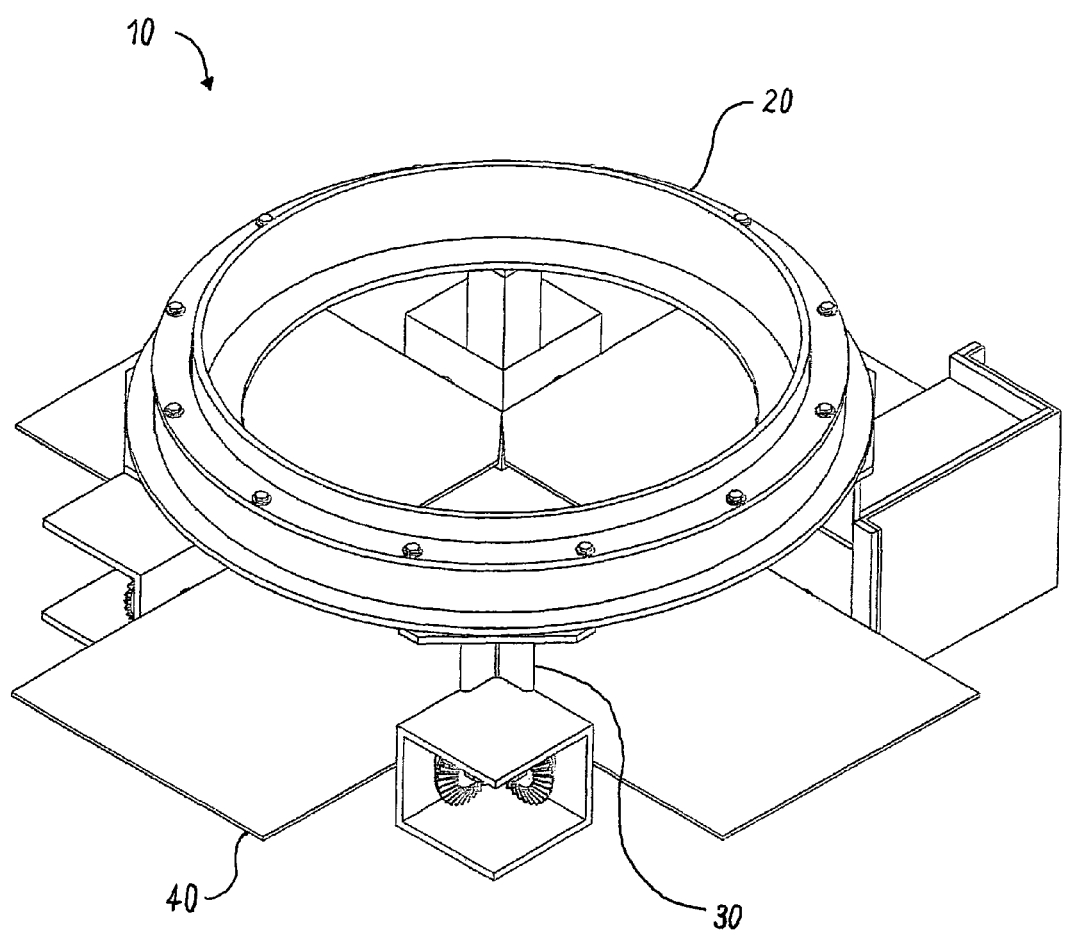
FIG. 1 is a perspective view of a preferred embodiment of the apparatus of this invention.
Figure 2:
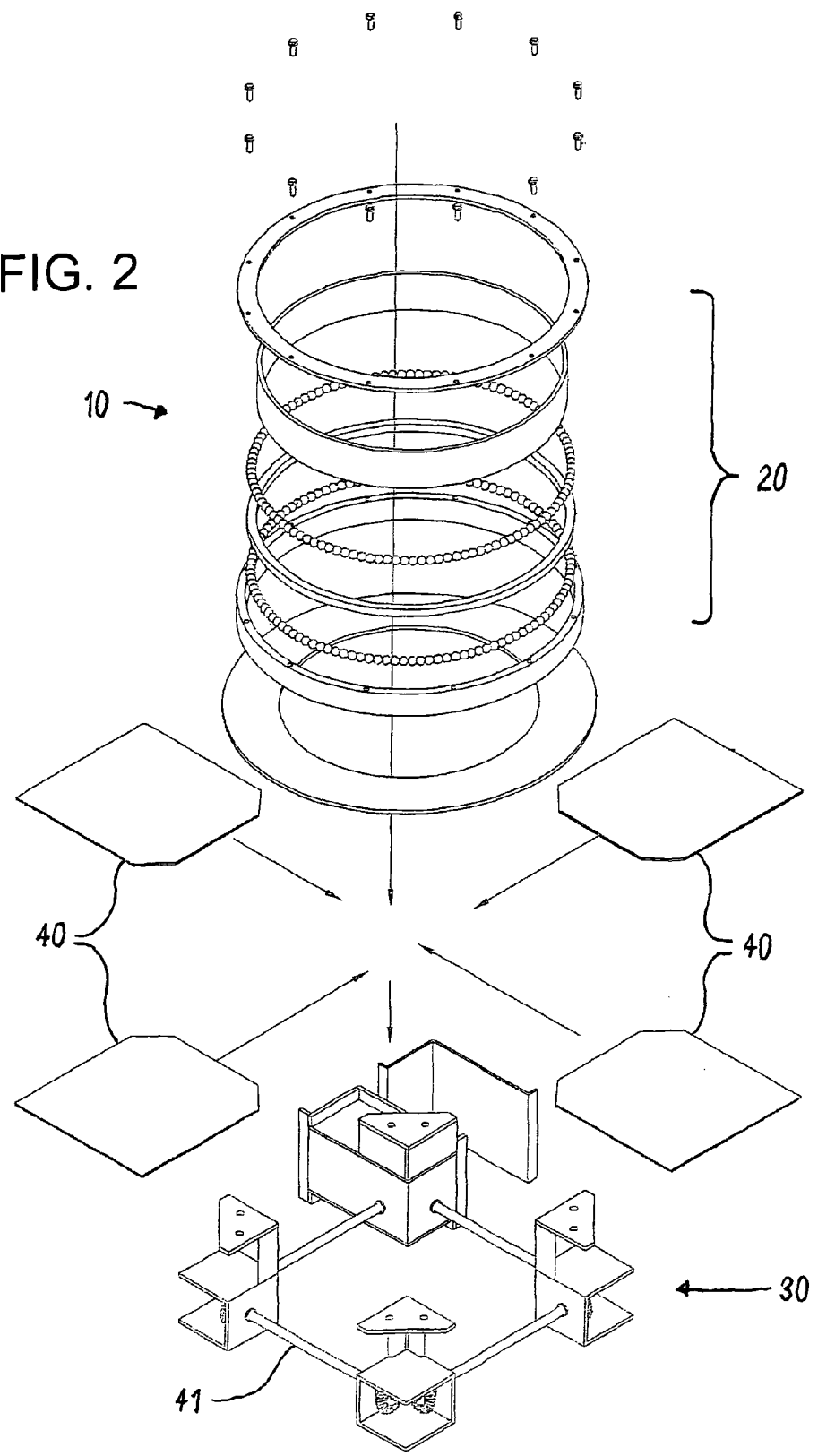
FIG. 2 is an exploded view thereof.

This invention is best understood by reference to the drawings. Referring to FIGS. 1 and 2, a preferred embodiment of the flow diverter apparatus 10 of this invention comprises a fitting 20, a frame 30, four baffles 40, and a drive motor 50. Each of the components of the flow diverter is discussed in more detail below.

The fitting 20 of the flow diverter removably attaches to the discharge of a bulk solids conveyor. The fitting has a vertical conduit to allow the bulk solids to flow downward through the fitting by gravity. The size, shape, and exact structure of the fitting are matters of choice that depend on the conveyor to which it will be attached. In the preferred embodiment, the fitting is a separate component of the flow diverter. Alternatively, the fitting is integral with the frame or part of the bulk solids conveyor. As best seen in FIG. 2, the fitting of the preferred embodiment is made of multiple rings and two courses of ball bearings that enable the fitting to freely rotate when attached to the conveyor discharge. While not essential, the free rotation is advantageous to reduce the possibility of binding in some situations. For example, when loading into an elongated bin having a lengthwise top opening with an articulating discharge conveyor, the fitting is preferably centered in the opening with suitable brackets and then tracks along the length of the opening as the discharge conveyor is moved.

The frame 30 of the flow diverter is attached to the fitting. The frame provides the support for the baffles. The frame has a vertical conduit that communicates with the vertical conduit of the fitting to allow the bulk solids to flow downward by gravity into the bin or other container. The frame generally has a plurality of side walls with openings in which the baffles pivot. The frame preferably has three to five side walls and most preferably has four side walls. In the preferred embodiment, the frame comprises four corner sections that are connected together by four shafts, described below. Three of the corner sections contain gear box assemblies, as best seen in FIG. 3, and one of the corner sections contains a motor box assembly, as best seen in FIG. 4.

The baffles 40 of the flow diverter are plates that pivot in the openings of the side walls of the frame. The baffles are attached to rotating shafts 41 that extend between the corners of the frame. The movement of a shaft determines the movement of its attached baffle. In the preferred embodiment, the shafts extend the entire distance and the baffles are attached to the shafts by welding. Other means of attachment, including brackets, fittings, and the like, are also suitable. It is also suitable to split a shaft into two section so that a short section extends outwardly from each side of a baffle. Each baffle is capable of variable positioning between a first position, generally substantially vertical, that opens the vertical conduit of the frame and a second position, generally substantially horizontal, that substantially closes the vertical conduit of the frame. The two inner corners of each baffle are preferably truncated so the baffles do not contact each other when in the second position. The baffles preferably move in coordination.

The flow diverter includes a means for moving the baffles. In the preferred embodiment, one of the shafts in controlled by a drive motor 50 at one end and the movement of the other three shafts is coordinated through bevel gears 51 that are attached to the other ends of the shafts. The drive motor is an article of commerce. A suitable drive motor is a DC drive motor with a built-in circuit breaker having a working amperage load of 11 amperes, an operating voltage range of 12 to 24 volts, and a speed of 60 revolutions per minute that is manufactured by Dorman Products, Inc. of Colmar, Pa. The drive motor is controlled with a conventional control system.

Figure 5:
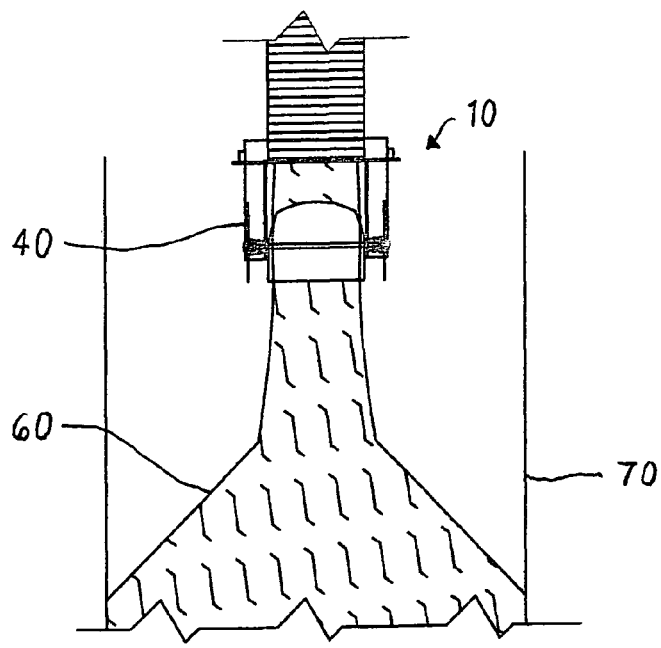
FIG. 5 is a simplified view of the apparatus in use with the baffles in a first position.
Figure 6:
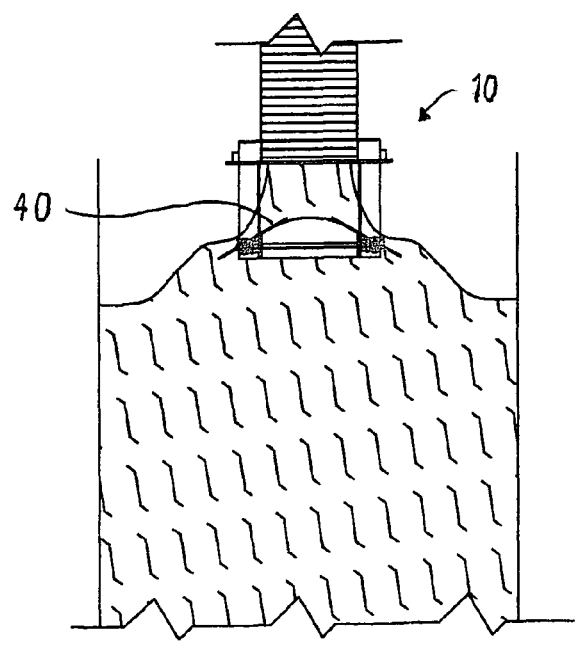
FIG. 6 is a simplified view of the apparatus in use with the baffles in a second position.

The use of the flow diverter can now be considered. The flow diverter is first attached to the discharge of a bulk solids conveyor. Referring now to FIG. 5, when the baffles are in a vertical position, the flow of bulk solids through the diverter (represented by the wavy arrows) is unimpeded and the bulk solids flow out the bottom of the diverter without a change in direction. The bulk solids form a conical pile 60 in a bin 70 at the angle of repose of the solids. Referring now to FIG. 6, when the baffles are moved toward the horizontal position, a portion of the bulk solids flowing into the diverter is diverted outwardly by the baffles. The portion being diverted is a function of the angle of the baffles. When the baffles are substantially horizontal, a substantial portion of the bulk solids are diverted outward and only a small portion drops straight down. With the diversion, a bin can be filled near capacity and is not limited by the angle of repose.

I claim:

1. An apparatus for diverting the flow of bulk solids into a bin from a discharge of a bulk solids conveyor, the apparatus comprising:
   (a) a fitting for removable attachment to a discharge of a bulk solids conveyor, the fitting having a vertical conduit;
   (b) a frame connected to the fitting, the frame having a vertical conduit communicating with the vertical conduit of the fitting, the frame also having four side walls, each with an opening;
   (c) four baffles that pivot on rotating shafts in the openings of the side walls of the frame, each baffle being capable of variable positioning between a first substantially vertical position that opens the vertical conduit of the frame to allow any bulk solids flowing into the diverter to flow out of the diverter without a change in direction and a second substantially horizontal position that at least partially closes the vertical conduit of the frame to cause a portion of any bulk solids flowing into the diverter to be diverted outward; and
   (d) a drive motor to rotate the baffles.

2. The apparatus of claim 1 wherein each rotating shaft engages an adjacent rotating shaft so that movement of one rotating shaft causes simultaneous movement of each rotating shaft.

3. The apparatus of claim 2 wherein the fitting is freely rotatable.

4. An apparatus for diverting the flow of bulk solids into a bin from a discharge of a bulk solids conveyor, the apparatus comprising:
   (a) a frame adapted for removable connection to a discharge of a bulk solids conveyor, the frame having a vertical conduit for the flow of bulk solids and also having four side walls, each with an opening;
   (b) four baffles that pivot on rotating shafts in the openings of the side walls of the frame, each baffle being capable of variable positioning between a first substantially vertical position that opens the vertical conduit of the frame to allow any bulk solids flowing into the diverter to flow out of the diverter without a change in direction and a second substantially horizontal position that at least partially closes the vertical conduit of the frame to cause a portion of any bulk solids flowing into the diverter to be diverted outward; and
   (c) a drive motor to rotate the baffles.

5. The apparatus of claim 4 wherein each rotating shaft engages an adjacent rotating shaft so that movement of one rotating shaft causes simultaneous movement of each rotating shaft.

6. The apparatus of claim 5 wherein the baffles have inner corners that are truncated.

7. An apparatus for diverting the flow of bulk solids into a bin from a discharge of a bulk solids conveyor, the apparatus comprising:
   (a) a frame adapted for removable connection to a discharge of a bulk solids conveyor, the frame having a vertical conduit for the flow of bulk solids and also having three to five side walls, each with an opening;
   (b) a baffle that pivots on a rotating shaft in the opening of each side wall of the frame, each baffle being capable of variable positioning between a first position that opens the vertical conduit of the frame to allow any bulk solids flowing into the diverter to flow out of the diverter without a change in direction and a second position that at least partially closes the vertical conduit of the frame to cause a portion of any bulk solids flowing into the diverter to be diverted outward; and
   (c) a drive motor to rotate the baffles.

* * * * *